(12) United States Patent
Karr

(10) Patent No.: US 6,999,545 B2
(45) Date of Patent: Feb. 14, 2006

(54) METHOD AND SYSTEM FOR UNDERSAMPLED SYMBOL SYNCHRONIZATION

(75) Inventor: Lawrence J. Karr, Santa Monica, CA (US)

(73) Assignee: Microsoft Corporation, Redmond, WA (US)

( * ) Notice: Subject to any disclaimer, the term of this patent is extended or adjusted under 35 U.S.C. 154(b) by 813 days.

(21) Appl. No.: 10/044,306

(22) Filed: Oct. 26, 2001

(65) Prior Publication Data

US 2003/0165206 A1    Sep. 4, 2003

(51) Int. Cl.
*H04L 7/00* (2006.01)

(52) U.S. Cl. .............. 375/367; 375/362; 375/368; 375/295

(58) Field of Classification Search .......... 375/368, 375/367, 369, 366; 370/514, 515, 513; 708/252
See application file for complete search history.

(56) References Cited

U.S. PATENT DOCUMENTS

| | | | |
|---|---|---|---|
| 4,004,100 A * | 1/1977 | Takimoto | 370/515 |
| 4,665,519 A | 5/1987 | Kirchner et al. | 370/94 |
| 4,761,796 A | 8/1988 | Dunn et al. | 375/1 |
| 4,910,511 A | 3/1990 | Nagata et al. | 340/825 |
| 5,038,405 A | 8/1991 | Karr | 455/197 |
| 5,046,066 A | 9/1991 | Messenger | 370/94.1 |
| 5,136,719 A | 8/1992 | Gaskill et al. | 455/193.1 |
| 5,243,356 A | 9/1993 | Hama | 343/718 |
| 5,301,358 A | 4/1994 | Gaskill et al. | 455/56.1 |
| 5,732,333 A | 3/1998 | Cox et al. | 455/126 |
| 5,757,782 A | 5/1998 | Gaskill | 370/313 |
| 5,854,985 A | 12/1998 | Sainton et al. | 455/553 |
| 5,884,140 A | 3/1999 | Ishizaki et al. | 455/2 |
| 5,928,322 A | 7/1999 | Bitar et al. | 709/4 |
| 5,974,034 A | 10/1999 | Chin et al. | 370/328 |
| 6,012,159 A | 1/2000 | Fischer et al. | 714/755 |
| 6,111,896 A | 8/2000 | Slattery et al. | 370/535 |

FOREIGN PATENT DOCUMENTS

WO    WO 00/28680    3/2000

OTHER PUBLICATIONS

Sklar, "Digital Communications Fundamentals and Applications", published by Prentice Hall, in 2000, pp. 729-730.*
Gasgill et al., "High Speed Subcarrier Data System (HSDS)," *Seiko Communications*, Sep. 21, 1993, 14 pgs.
Ambient, "The Ambient Platform," Sep. 5, 2002, 2 pgs.

* cited by examiner

*Primary Examiner*—Phuong Phu
(74) *Attorney, Agent, or Firm*—Merchant & Gould

(57) ABSTRACT

Described is a system and method for providing a synchronization pattern in a communication system. The method includes generating a synchronization pattern with good randomness properties; packing a signal for transmission with m headers, each header consisting of the synchronization pattern 1/m symbol-time shifted from the previous header; and transmitting the signal. A further method provides for the sampling the transmitted signal with m headers of symbol-time shifted synchronization patterns; and determining symbol timing offset by computing and reordering correlation peaks from the synchronization patterns. A system includes a transmitting system, a receiving system, and a data channel. The transmitted signal includes m headers with 1/m symbol-time shifted synchronization patterns. The receiving system undersamples the transmitted signal with m synchronization patterns to simulate an oversampled synchronization pattern.

7 Claims, 6 Drawing Sheets

METHOD AND SYSTEM FOR UNDERSAMPLED SYMBOL SYNCHRONIZATION

FIELD OF THE INVENTION

The present invention relates generally to data communications systems. More particularly, the present invention relates to symbol synchronization in communication systems.

BACKGROUND OF THE INVENTION

Analog or digital information may be communicated to a remote receiver using a variety of communication theory techniques. A typical transmission system includes a transmitter, a communication channel, and a receiver. The transmitter converts the analog or digital information into a form that is suitable for transmission over the communication channel. The receiver recreates the original information from the transmitted signal. The communication channel may be any transmission medium such as wire, optical fiber, or merely free space in which the signals are transmitted as an electromagnetic wave (e.g., radio and television signals).

In a typical wireless communication system, a data signal that includes the information is modulated with a carrier signal and transmitted into free space with an antenna. The receiving system has an antenna and receiver that are tuned to the carrier frequency. The receiving system receives and demodulates the transmitted signal and extracts the data signal.

Accurately decoding the data signal at the remote receiver may be dependent on the transmitter and receiver maintaining symbol synchronization during decoding of the information. The receiving system samples the transmitted signal in phase with the transmitter. If the receiver and transmitter were supplied by exactly the same clock source, then the data signal would always be sampled in perfect symbol synchronization with the transmitter. Because this is seldom the case, the transmitter and receiver must be carefully designed such that the receiver can be brought into symbol synchronization with the transmitter.

SUMMARY OF THE INVENTION

This summary of the invention section is intended to introduce the reader to aspects of the invention and is not a complete description of the invention. Particular aspects of the invention are pointed out in other sections herein below and the invention is set forth in the appended claims, which alone demarcate its scope.

The present invention is directed to a system and method for simulating an oversampled synchronization pattern for use in a communications system. The invention is also related to a method for generating synchronization patterns within a data packet for use in symbol synchronization of undersampling receiver systems to simulate an oversampled synchronization pattern.

Briefly stated, described is a system and method for generating a synchronization pattern once, omitting a fraction of the final symbol-time of the synchronization pattern to generate an offset synchronization pattern, omitting a fraction of the final symbol-time of the offset synchronization pattern, and repeating the method steps m times. The m synchronization patterns are transmitted over a data channel to a receiving system. A further system and method allows for a receiving system to baud rate capture the m transmitted synchronization patterns and generate a symbol synchronization-offset signal from a reordered correlation peak of the m synchronization patterns.

In accordance with one aspect of the present invention, a system provides a synchronization pattern for use in communication systems. The system includes a generation system for providing a plurality of synchronization patterns, and an encoding system that is arranged to provide an information signal with a plurality of headers. Each of the headers includes one of the synchronization patterns, where each of the synchronization patterns differs from the other synchronization patterns by a time-shift.

In another aspect of the present invention, a receiving system provides a symbol synchronization-offset signal for use in a communication system. The receiving system includes a sampling system, a correlation generating system, and a symbol synchronization detecting system. The sampling system is arranged to obtain a transmitted information signal with a plurality of synchronization patterns, where each of the synchronization patterns differ from the other synchronization pattern by a time-shift. The correlation generating system provides a correlation peak for each of the plurality of synchronization patterns, reorders the patterns, and provides a symbol synchronization-offset signal.

In yet another aspect of the present invention, a method is directed at providing a synchronization pattern for use in a wireless communication system. The method includes generating a synchronization pattern; encoding an information signal with m headers; transmitting the encoded information signal over a wireless communications system; sampling the encoded information; generating a correlation peak from the m transmitted synchronization patterns; and reordering the correlation peaks to provide a receiver symbol synchronization-offset pattern simulating an m times oversampled synchronization pattern. Each of the m headers, after the first header, includes the synchronization pattern shifted by a fraction bit time from the other synchronization patterns.

In still another aspect of the present invention, the synchronization pattern is at least one of a random sequence, a pseudo-random sequence, and a periodic sequence. The pattern further includes a maximal-length sequence of length 15, generated by a 4-bit linear feedback shift register.

In another aspect of the present invention, an encoded data structure is directed at providing a synchronization pattern for use in a communications system. The encoded data structure includes a plurality of data fields stored in a plurality of headers of a data packet. Each of the plurality of data fields includes a synchronization pattern. Furthermore, each synchronization pattern differs from the other synchronization pattern by a fractional symbol-time shift.

A more complete appreciation of the present invention and its improvements can be obtained by reference to the accompanying drawings, which are briefly summarized below, to the following detailed description of illustrative embodiments of the invention, and to the appended claims.

DETAILED DESCRIPTION OF THE PREFERRED EMBODIMENT

Figure 1:
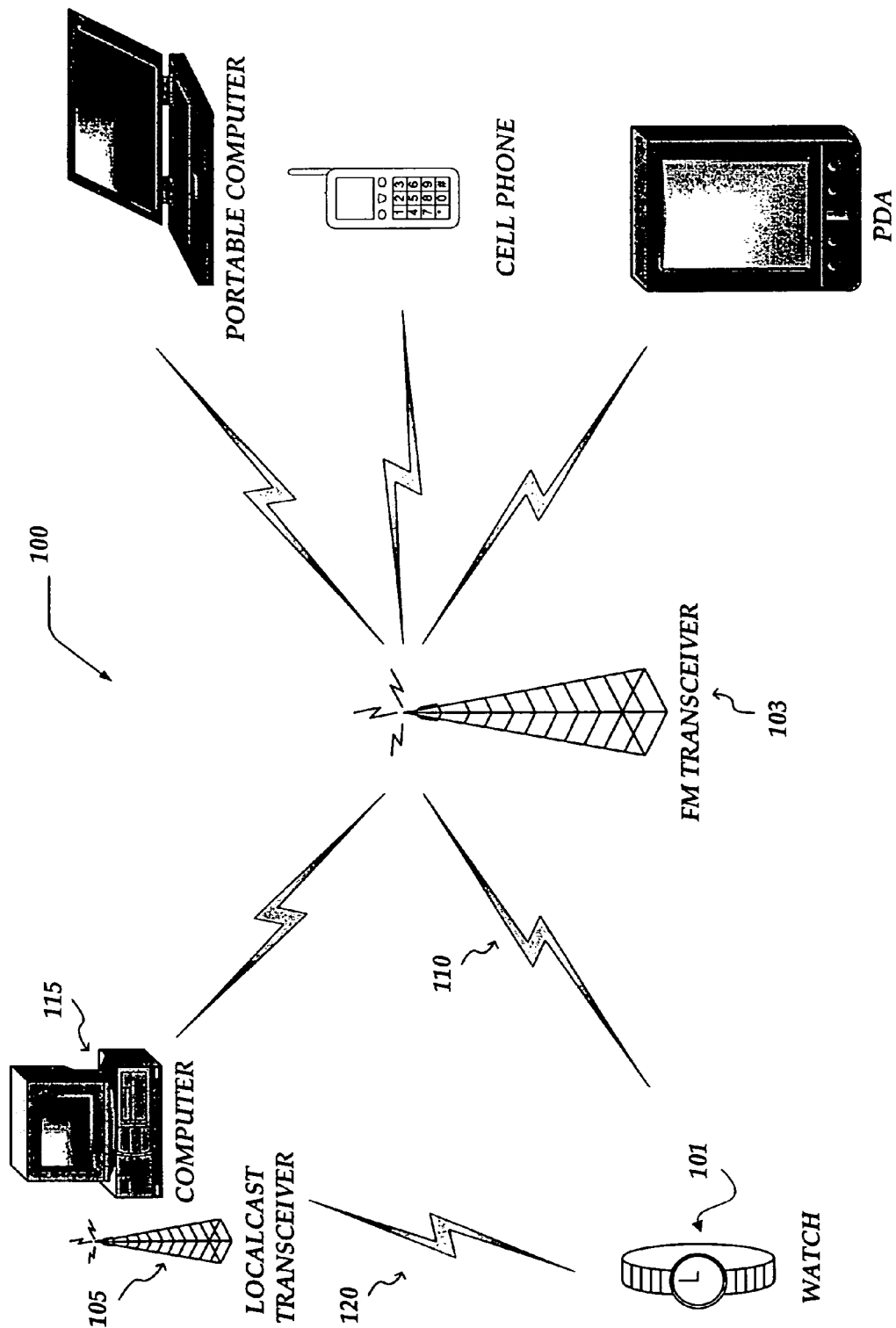
FIG. 1 illustrates a functional block diagram of an operating environment in which the present invention may be implemented.

In the following detailed description, reference is made to the accompanied drawings in which are shown specific exemplary embodiments of the invention. These embodiments are described in sufficient detail to enable those skilled in the art to practice the invention, and it is understood that other embodiments may be utilized, and other changes may be made, without departing from the spirit or scope of the invention. The following detailed description is, therefore, not to be taken in a limiting sense, and the scope of the invention is defined only by the appended claims. Referring to the drawings, like numbers indicate like parts throughout the views.

Throughout the specification, and in the claims, the term "signal" means at least one current signal, voltage signal, electromagnetic wave signal, or data signal. The meaning of "a," "an," and "the" include plural references. The meaning of "in" includes "in" and "on."

The present invention generally relates to symbol synchronization between receivers and transmitters in a communication system. The receivers and transmitters operate asynchronous with respect to one another. An undersampled synchronization pattern is provided in the transmission. By repeating the undersampled synchronization pattern throughout the transmission, an oversampled synchronization pattern is simulated such that symbol synchronization is achieved by undersampling the data signal from the transmission.

The overall operating environment for the undersampled synchronization receiver system will be discussed as follows with reference to FIGS. 1 and 2.

Operating Environment

FIG. 1 illustrates an exemplary operating environment (100) for the present invention. As illustrated in the figure, an FM signal or broadcast is transmitted over a communication channel (110) to various electronic devices. Example electronic devices that have an FM receiver or transceiver may include a desktop computer (115), a watch device (101), a portable computer, a wireless cellular telephone (cell phone), a personal data assistant (PDA), or the like. The electronic devices are arranged to receive information from the FM broadcast. The FM broadcast may be of any number of types including but not limited to a standard FM transmission, a sub-carrier FM transmission, or any other type of FM transmission as may be desired.

FM sub-carriers are often referred to as an SCA as identified by the Federal Communications Committee (FCC) term for the Subsidiary Communications Authorization. An FM sub-carrier often utilizes bandwidth that is otherwise unused in the FM stereo-band of an FM station. In the United States of America, the FCC requires the modulation bandwidth to be roughly from 53 KHz to 100 KHz within the modulation bandwidth of the FM station.

The electronic devices, such as the desktop computer (115), may also include facilities to communicate with other electronic devices over a local broadcast or localcast channel (120) as another operating mode. In this case, the desktop computer (115) may be in communication with a localcast transceiver (105) that transmits and receives over a more limited distance than the FM transceiver (103). The localcast transceiver (105) may be coupled to the desktop computer (115), or other similar data source, through a communications interface, such as a Universal Serial Bus (USB), an RS-232 serial port, and an optical communication port (i.e., infrared serial port).

Although described here in the context of a watch-based system, it will be apparent that the teachings of the application have equal applicability to any other mobile or non-mobile devices, such as portable and desktop computers, personal digital assistants (PDAs), cellular telephones, and the like. The use of a watch is for illustrative purposes only to simplify the following discussion, and may be used interchangeably with "mobile device."

Figure 2:
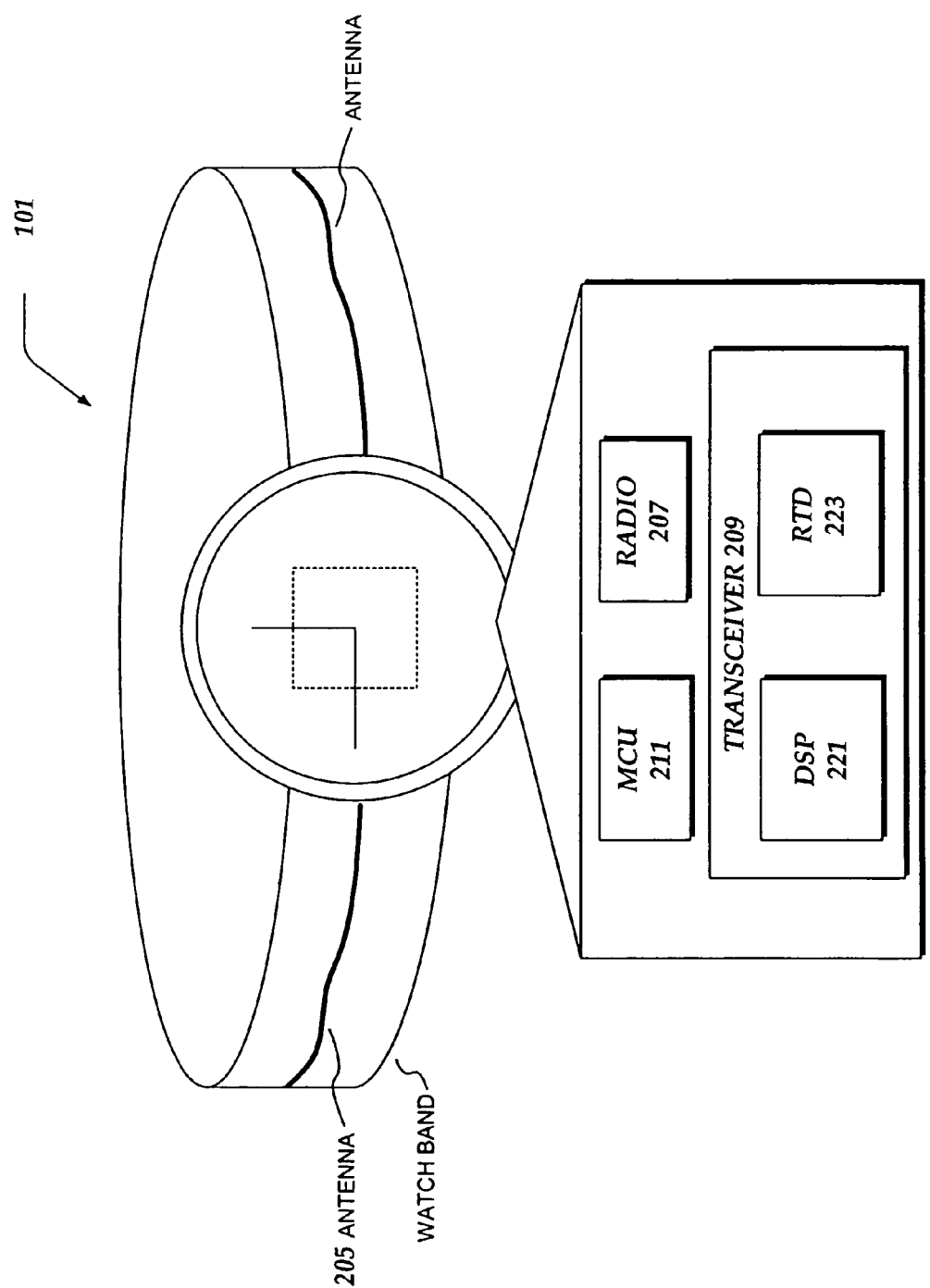
FIG. 2 illustrates a functional block diagram illustrating one implementation of the invention in a wireless apparatus, such as a wrist-worn mobile device.

FIG. 2 illustrates a watch device (101) that includes an electronic system arranged to operate as either a receiver or transceiver type of device. As illustrated in the figure, the watch device (101) includes four sub-components: a wrist-loop watchband antenna (205), an analog radio (207), a digital transceiver (209), and a MicroComputer assembly (the "MCU") (211). In this embodiment, the antenna (205) includes a watchband loop antenna and discrete analog tuning elements. The antenna (205) may be a conducting loop embedded in the watchstrap.

The antenna connects to, and is controlled by, the transceiver (209). Transactions between the MCU (211) and the radio components are mediated over the MCU-digital transceiver interface. The components of the watch device (101) are housed in a watch-sized enclosure and rely on battery power for operation.

The transceiver (209) generally includes two components, a digital signal processor (DSP) (221), which performs control, scheduling, and post-processing tasks for the transceiver, and a real time device (RTD) (223), which includes a digital radio, system timing, and real-time event dispatching. The DSP (221) is coupled to the MCU (211), and transceiver tasks are commanded by the MCU (211).

One of the DSP's main tasks is to process data that is received either in the broadcast mode or in the localcast mode. This processing may include subcarrier phase recovery, baud recovery and/or tracking, compensation for fading effects, demodulation, deinterleaving, channel state estimation and error-correction. The post-processing of packets may occur when the entire packet has been received. This could occur immediately after capture in the localcast mode. The DSP analyzes the transmitted data packets to determine the localcast station's signal timing with respect to the RTD's local clock. The RTD's local clock is synchronized with the transmitter's clock signal to maintain signal sampling integrity.

The receiver is likely to misread the data signals when the receiver's local clock is not "in-synch" with the transmission rate of the transmitter. The receiver is periodically brought into symbol synchronization with the transmitter to minimize misreading of the received data. The method and system described below is directed to symbol synchronization of the receiver to the transmitter's transmission rate (baud rate) and phase.

The RTD's digital section contains system timebases, including the crystal oscillator that provides the system clock to the MCU (211) and DSP (221). The timebase also provides baud and sample timing for transmit and receive operations, start/stop control for radio operation, and controls the periods of clock suspension to the MCU (211) and DSP (221). The RTD also performs radio operations, and may perform additional operations as well.

RTD radio operation includes both subcarrier and localcast mode reception, and localcast mode transmission. These tasks use substantial numbers of common elements. The radio (207) receives either subcarrier segments or local mode packets, storing the received, filtered, baseband-converted A-to-D samples in a local RAM. When transmitting in the local mode, the local RAM is filled with pre-computed transmit samples by the DSP (221) that are used by the RTD (223) to generate the FSK signal for local mode transmission.

The operating environment shown in FIG. 2 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Illustrative Transmitting System

Figure 3:
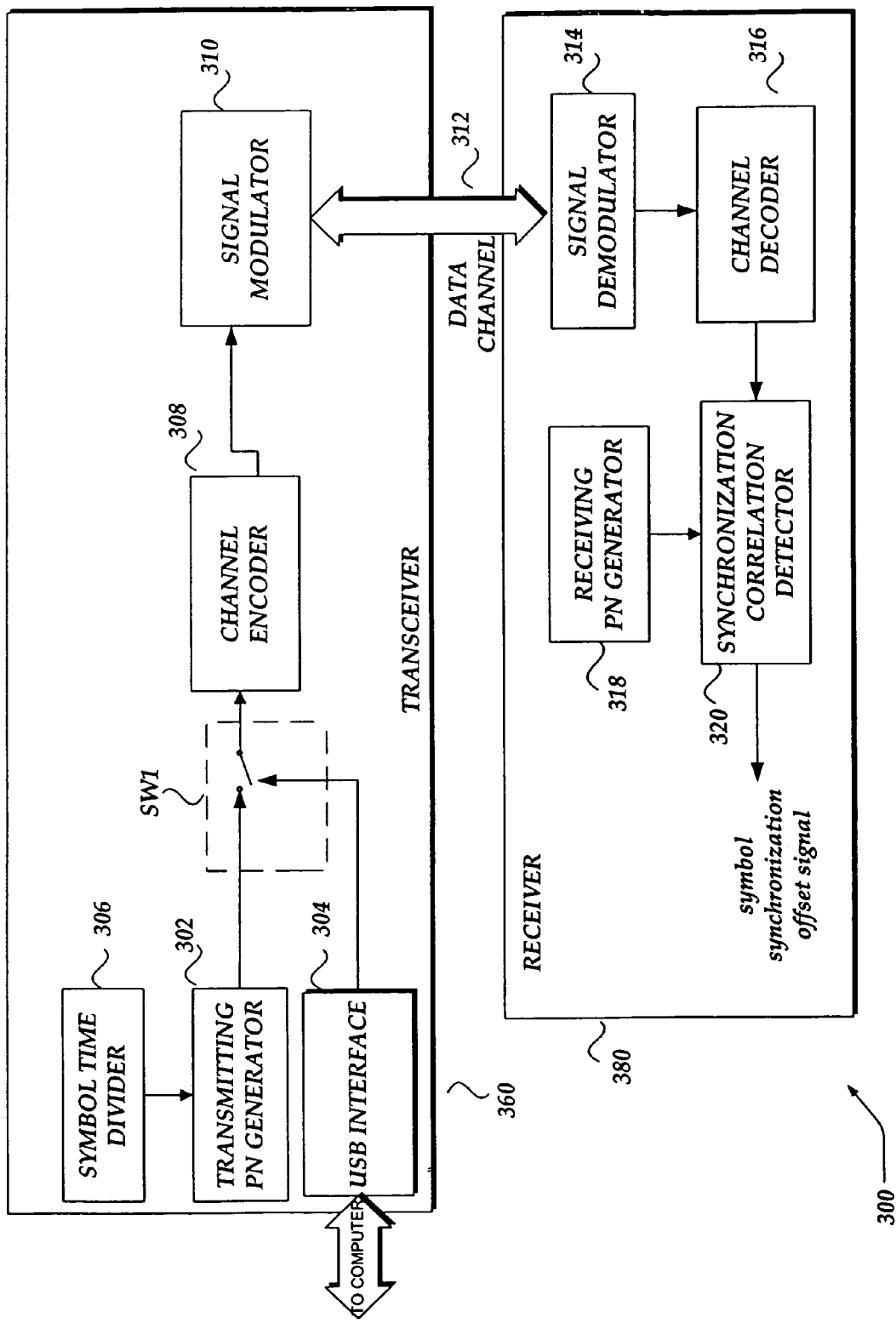
FIG. 3 is a functional block diagram illustrating an exemplary communications symbol synchronization system.

FIG. 3 illustrates a functional block diagram of one embodiment of a communication symbol synchronization system (300) for providing a synchronization pattern to a receiver. In the figure, a transmitting system (360) encodes information from a data source together with a synchronization pattern for transmission to a receiving system (380) through a data channel (312).

The transmitting system (360) includes a USB Interface (304), a transmitting Pseudo-random Number (PN) generator (302), a symbol-time divider (306), a channel encoder (308), a switching system (SW1), and a signal modulator (310).

The USB Interface (304) couples the transmitting system (360) to a data source (not shown), and collects information packets from the data source. The data source may transmit the information packets over the link in a data format that is dependent upon the particular link characteristics. Although a USB Interface (304) has been illustrated in the figure, it will be appreciated by those of ordinary skill in the art that the present invention is not limited to USB interfaces. For example, another interface such as an RS-232, Ethernet, optical interface (i.e. infrared serial port), or other communications interface that provides for data information exchanges may be employed without departing from the spirit or scope of the invention.

The symbol-time divider (306) is coupled to the transmitting PN generator (302). The output of the transmitting PN generator (302) is coupled to the switching system (SW1). The USB Interface (304) is also coupled to the switching system (SW1). The switching system (SW1) is coupled to the channel encoder (308). The channel encoder (308) is coupled to the signal modulator (310). The signal modulator (310) in turn is coupled to the data channel (312).

The output of the transmitting PN generator (302) is a synchronization pattern. In one embodiment, the transmitting PN generator (302) may be a storage device for a pre-generated, truly random synchronization pattern. In another embodiment, the synchronization pattern is a maximal-length pseudo-random number (PN) bit sequence generated by employing a linear feedback shift register (LFSR) as a component of the transmitting PN generator (302). The LFSR (not shown) may be implemented as a plurality of registers, connected in series, and an exclusive OR circuit. The output signals of two specified registers among the plurality of registers are supplied to the input node of the exclusive OR circuit, and the output signal of the exclusive OR circuit is fed back to the leading register. Additionally, a shift clock signal (not shown) included in the transmitting PN generator (302) is provided in common to the registers. The transmitting PN generator (302) employs the output of the symbol-time divider (306) to regulate the generation of additional synchronization patterns.

In the figure, the switching system (SW1) is arranged to provide a signal path between the transmitting PN generator (302) and the channel encoder (308), or between the USB Interface (304) and the channel encoder (308). The switching system (SW1) may be implemented in software, an electronic circuit, or a combination of software and electronic circuit arrangements that provide for switching data flows.

The channel encoder (308) combines the synchronization patterns from the transmitting PN generator (302) with an information packet from the USB Interface (304) to provide a particular data format to be transmitted through the selected data channel (312). The channel encoder (308) includes a convolutional encoder for the synchronization patterns and other header or trailer information (not shown), and an optional convolutional encoder for the information packet. The data format for the communications is described in more detail below. The channel encoder (308) may also include a shaping filter (not shown) to further structure the data for the selected data channel (312).

The formatted data packet is passed to the signal modulator (310) to be modulated using direct FSK modulation, or any other appropriate modulation scheme. The modulated data signal is then transmitted over the data channel (312) for reception by the receiving system (380).

In one embodiment, the transmitting system (360) is implemented in the localcast transceiver (105) of FIG. 1. However, the present invention is not limited to such an implementation, and may be employed in other well known computing systems, environments, or configurations, without departing from the scope or spirit of the invention.

Illustrative Receiving System

FIG. 3 also illustrates a schematic system diagram for a receiving system (380). The receiving system is arranged for symbol synchronizing of the local sampling clock in the receiver to the transmission rate (baud rate) and phase of the transmitting system (360). The receiving system (380) may be implemented by employing several components described in FIG. 2, or other similar receiving device. For example, the DSP (221) in FIG. 2 performs much of the processing of received data signals.

The receiving system (380) in FIG. 3 includes a signal demodulator (314), a channel decoder (316), a receiving PN generator (318), and a symbol synchronization correlation detector (302).

The input of the signal demodulator (314) is coupled to data channel (312). The signal demodulator (314) is coupled to the channel decoder (316). The output of the channel decoder (316) is coupled to the input of the symbol synchronization correlation detector (320). The receiving PN generator (318) is also coupled to the input of the symbol synchronization correlation detector (320).

When a data signal is captured that requires demodulation; the modulated data signal is passed to the signal demodulator (314). Capturing a data signal includes receiving of the data signal, as well as sampling of the data signal. The signal demodulator (314) may utilize any of a variety of methods to demodulate the FM signals from the data channel (312).

The output of the signal demodulator (314) is a demodulated data packet. The demodulated data packet is routed to the channel decoder (316). The channel decoder (316) strips off the packet headers, and optional packet trailers from the demodulated data packet. The packet headers and optional trailers contain the symbol synchronization patterns that are utilized by the symbol synchronization correlation detector (320).

The receiving system (380) employs a receiving PN generator (318) that produces a synchronization pattern that is essentially the same as the initial synchronization pattern produced by the transmitting PN generator (302) employed by the transmitting system (360). The synchronization patterns can, but need not be, dynamically computed. The synchronization patterns may have been stored on a storage device in the receiving system (380) depending on such constraints as power consumption or device size limitations. The receiving PN generator (318) provides its output for use in the symbol synchronization correlation detector (320).

The symbol synchronization correlation detector (320) utilizes the transmitted synchronization patterns from either the channel decoder (316) or from a storage device. The symbol synchronization correlation detector (320) computes a symbol synchronization-offset signal by comparing the transmitted synchronization patterns to those synchronization patterns generated locally at the receiving PN generator (308). The symbol synchronization-offset signal may be provided to the RTD (223) in FIG. 2 for adjusting the local clock drift, and aligning the sampling of the received signals to the baud rate of the transmitting system (360).

Illustrative Data Packet Format

Figure 4:
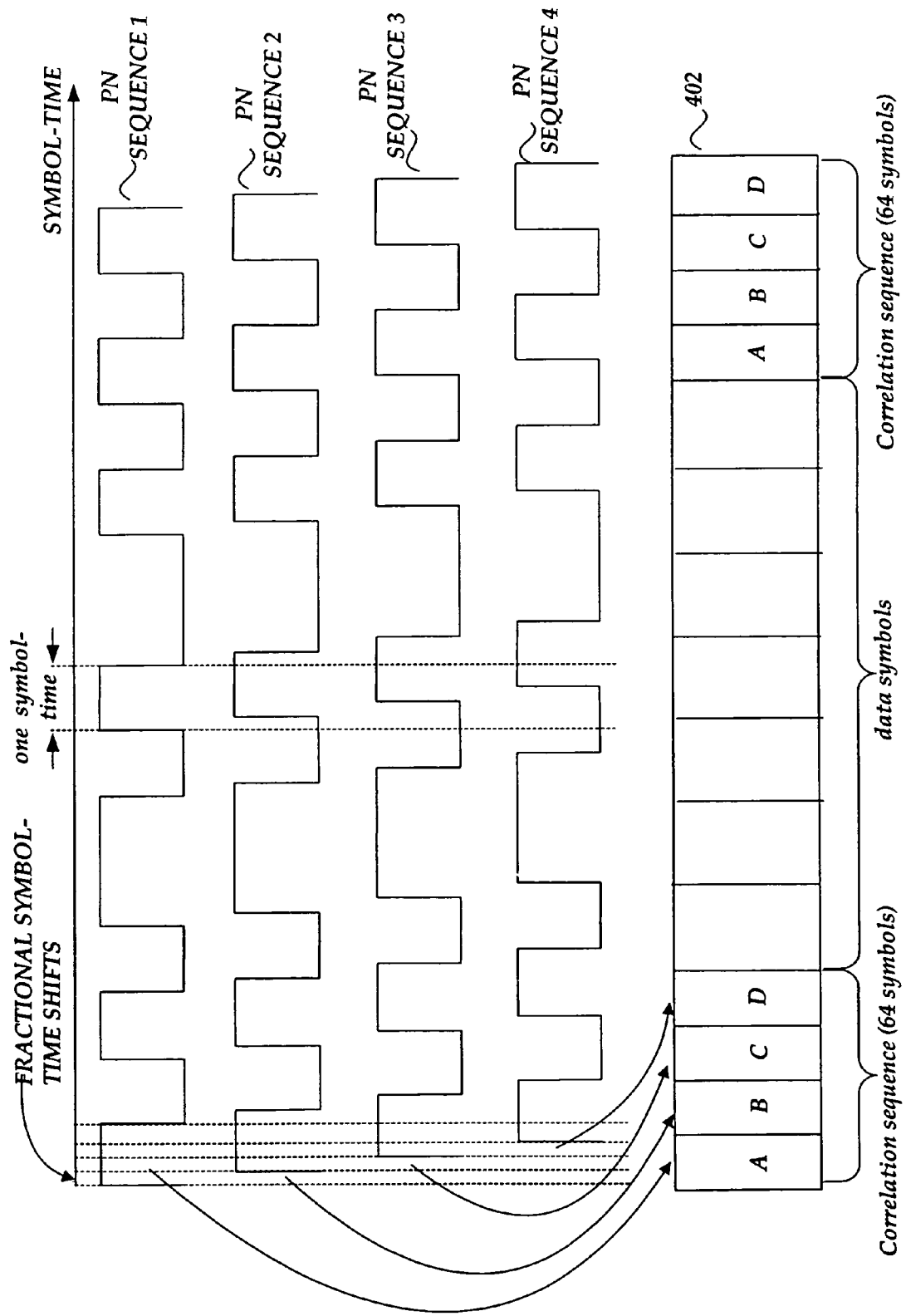
FIG. 4 is a graphical representation of a data construct or format for use in symbol synchronization of communications systems.

FIG. 4 illustrates an example of a data format for communications according to one embodiment of the present invention. The disclosed embodiment is but one format and alternatives will become readily apparent to those skilled in the art from the teachings of the present invention.

In FIG. 4, a data packet (402) is illustrated. The data packet (402) includes four correlation headers (A, B, C, D), formatted data symbols, and four correlation trailers. The formatted data symbols include the encoded information packets from the data source. The four correlation trailers (A, B, C, D) may be identical structure and format as the four correlation headers, and are typically provided for redundancy. Each correlation header and trailer includes a complete symbol-time shifted synchronization pattern (PN sequence) padded to 16 bits. That is, correlation header and trailer A include PN Sequence 1. Correlation header B and trailer B include PN Sequence 2. Correlation header C and trailer C include PN Sequence 3, and correlation header D and trailer D include PN Sequence 4.

Also shown in FIG. 4, each of the PN Sequences 1 through 4 differ from each other PN sequence by a fractional symbol-time shift. The symbol-time shifted synchronization patterns are described in more detail below.

While FIG. 4 illustrates four correlation headers and four correlation trailers, it is apparent to one skilled in the art any other number of correlation headers or trailers may be employed. For example, three correlation headers or trailers may be employed without departing from the spirit or scope of the invention.

Generalized Operation

Figure 5:
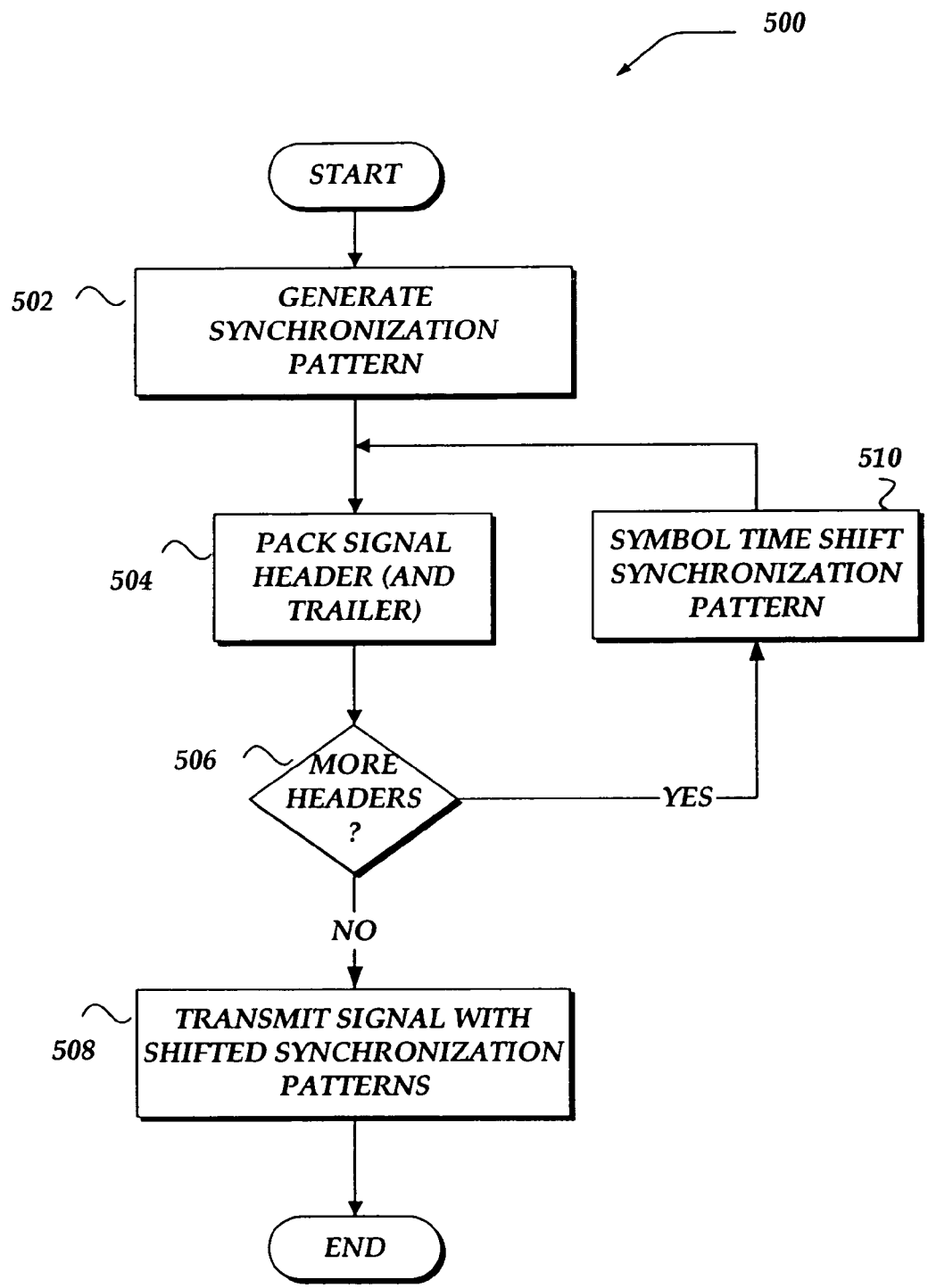
FIG. 5 is a processing flow diagram illustrating one implementation for generating symbol synchronization headers.

FIG. 5 shows a flowchart generally illustrating a process for generating synchronization headers for transmission in a communications system, in accordance with one embodiment of the invention.

The generate synchronization header process (500) starts processing at block 502, where an initial synchronization pattern is generated. While a variety of binary bit patterns may be employed for symbol synchronization of systems, it is desirable to generate a pattern that has good randomness properties. That is, a pattern of length N should have a correlation function with the property that $$\Phi(0)=N, \text{ and}$$

$$\Phi(j)=|1/N|, \text{ for } 1 \leq j \leq N-1.$$

Because an algorithm using a finite state machine produces a periodic sequence, long period sequences are employed, called pseudo-random (PN) sequences, for synchronization patterns. A maximal-length pseudo-random binary sequence may be readily generated using finite (Galois) field mathematics. It may be shown that a full period correlation function of maximal-length sequences generated by linear feedback shift registers substantially satisfy the properties above.

For example, the period, N, of pseudo-random number sequences generated by an LFSR consisting of m-bit registers is equal to that of maximum linearly recurring sequences, $2^m-1$. That is, an identical set of pseudo-random numbers is generated repeatedly for every period of $N=2^m-1$. In one full period, N, a binary sequence contains exactly $2^{m-1}$ ones, and $2^{m-1}-1$ zeroes. Moreover, the correlation function is approximately N for zero delay, and approximately $-1/N$ at all other times. For large N, the above randomness properties substantially are satisfied. Although the present invention employs an LFSR with a PN sequence of length N=15, m may be of any positive, non-zero integer value.

It will be appreciated by those of ordinary skill in the art that a synchronization pattern may be generated by a variety of techniques, and the technique for generating the synchronization pattern employed should not be construed as limiting the scope of the invention. For example, the synchronization pattern may be generated by a Fibonacci implementation LFSR, a Galios implementation, or any sofware techniques, electronic techniques, or a combination of software and electronic techniques to produce a pseudo-random number sequence with the described randomness properties. Alternatively, any bit sequence that is uniquely identifiable from the information data may be utilized as the synchronization pattern.

After a synchronization pattern is generated at block 502, the process proceeds to block 504. At block 504, the synchronization pattern is packed into a signal header and trailer. As the total correlation headers (A, B, C, D) comprise 64 symbols, and the first synchronization pattern is of length N=15, an additional pad is provided to produce 16 symbols per correlation header (trailer). The padded synchronization pattern is packed into the A correlation header and correlation trailer location of the localcast data packet (402), as illustrated in FIG. 4. After the correlation header and trailer are packed, the process proceeds to decision block 506.

At decision block 506, it is determined whether more correlation headers are to be packed. If more correlation headers (and correlation trailers) remain to be packed with the synchronization pattern, the process proceeds to block 510. Otherwise, the process continues at block 508. At this point, only the header is packed, so the process continue at block 510.

At block 510, the synchronization pattern generated at block 502 is modified by symbol-time shifting the initial synchronization pattern by a fraction of a symbol-time, such as ¼ (1/m) of a symbol-time. The result of the symbol-time shifting is that a fraction of the final symbol-time is omitted, as illustrated in FIG. 4 with PN sequence 2, and hence the entire synchronization pattern is translated in time by that amount. One symbol-time is recognized as the duration of one data bit on the particular data channel, and is the inverse of the data transfer rate for the particular data channel. The process then returns to block 504.

At block 504, substantially the same process occurs as above, except that on the second pass, block 504 now employs the ¼ symbol-time shifted synchronization pattern to pack correlation header B and correlation trailer B. As the synchronization pattern has been symbol-time shifted to 14¾ symbol-times, padding may be provided to produce a 16-symbol header and trailer. The process then proceeds to decision block 506.

The above process loop (block 504 to 506 to 510) continues until all of the correlation headers have been packed. During each process loop, the previous symbol-time shifted synchronization pattern is again symbol-time shifted by ¼ of a symbol-time, omitting another ¼ of the final symbol-time of the synchronization pattern.

At decision block 506, once it is determined that there are no more correlation headers (A through D) to be packed, the process proceeds to block 508.

At block 508, information data is supplied to complete the information signal and the completed information signal is transmitted. The process then ends after the completed information signal with the symbol-time shifted synchronization patterns is transmitted.

Figure 6:
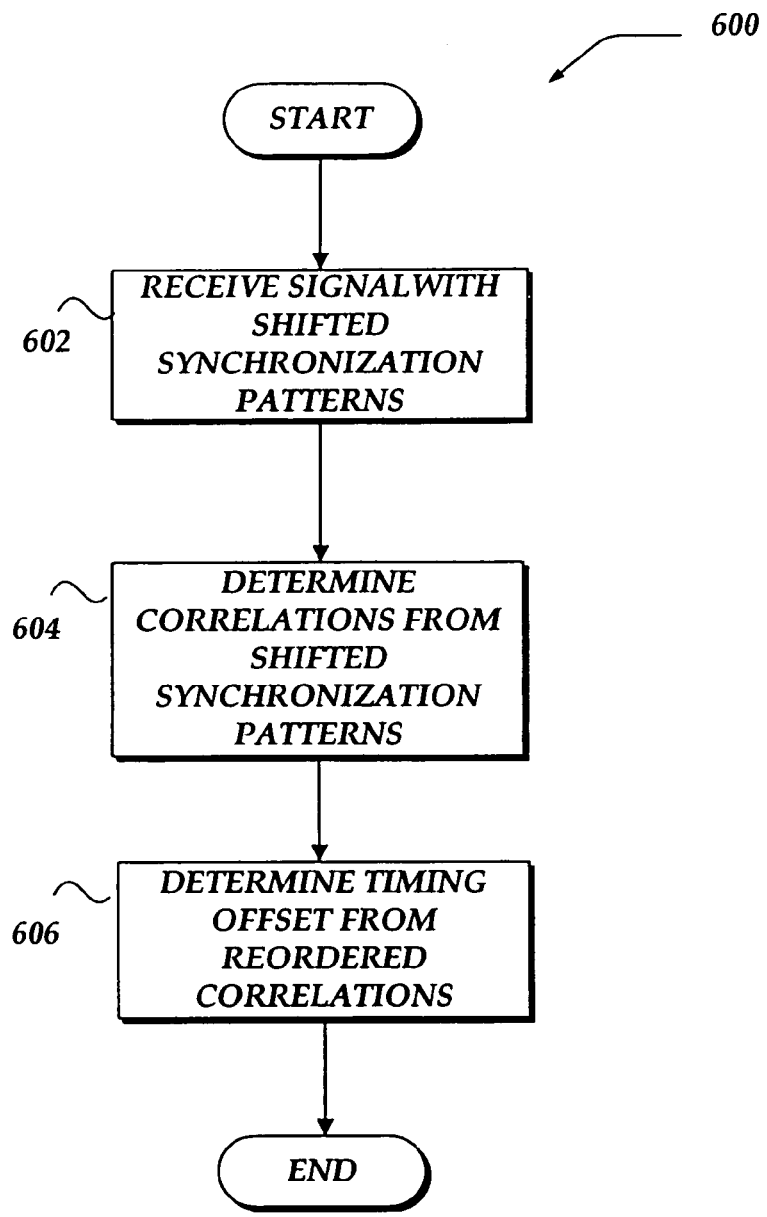
FIG. 6 is a processing flow diagram illustrating one implementation for generating a symbol synchronization-offset signal from a received symbol synchronization header, in accordance with the present invention.

FIG. 6 shows a flowchart illustrating a process for employing synchronization headers for symbol synchronization of a receiving system. As shown in the figure, the receive synchronization header process (600) begins processing at block 602, where any information signal has been constructed in accordance with the invention, such as through the use of the process (500) described above.

At block 602, the transmitted signal with the symbol-time shifted synchronization patterns is received. Upon reception of the transmitted signal, the symbol-time shifted synchronization patterns are extracted. The process then proceeds to block 604.

At block 604, a correlation function is determined for each of the symbol-time shifted synchronization patterns (from correlation header A, B, C, and D). The correlation functions are determined by convolving each symbol-time shifted synchronization pattern with the substantially identical synchronization pattern that is generated at block 502 in the generate synchronization header process (500) (as shown in FIG. 5). The four correlation functions generated produce four correlation peaks that are then reordered to produce a reconstituted single correlation function. The process then proceeds to block 606.

At block 606, the single correlation peak in block 606 is employed to determine an estimate of the difference in clock times between the transmitting system and the receiving system. The clock difference can then be used to accurately synchronize the sampling of the information signals based on the transmitter clock rate, thereby allowing a lower sampling rate for the information data, without sacrificing accuracy.

By employing four symbol-time shifted synchronization patterns that have been transmitted once, and captured once, the present invention simulates a four times oversampled synchronization pattern. The present invention has the advantage of low rate sampling with the result of an improved (higher) signal to noise ratio over that of an approach that samples the data signal at a higher sampling rate (e.g., four times).

In the above illustrations, the four synchronization headers and trailers were employed. However, the invention is not limited to such implementation. For example, three headers could be employed, with a symbol-time shift of ⅓ rather than ¼. Thus, the present invention may utilize m synchronization headers with a bit time shift of 1/m. Alternatively, m synchronization headers may be employed, with a symbol-time shift of 1/n, where n≠m, without departing from the spirit or scope of the present invention.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. A method for symbol synchronization in a communication transmitter, the method comprising the steps of:
   generating a synchronization pattern;
   encoding m portions of an information signal with m headers to provide an encoded information signal, m being a positive integer and each header comprising the synchronization pattern, wherein after the first synchronization pattern, each synchronization pattern is shifted by a fraction of a symbol-time from the other synchronization patterns, and wherein the fraction of a symbol-time is 1/n, n being any positive, non-zero integer such that m is not equal to n; and
   transmitting the encoded information signal over a communication medium.

2. The method of claim 1, wherein after the first synchronization pattern in the first header, each synchronization pattern is shifted by a multiple of 1/m of a symbol-time from the previous synchronization pattern.

3. The method of claim 1, wherein the synchronization pattern is at least one of a random sequence, a pseudo random sequence, and a periodic sequence.

4. The method of claim 1, wherein the synchronization pattern is a periodic sequence that is uniquely identifiable from the information signal.

5. The method of claim 1, wherein the synchronization pattern further comprises a maximal-length sequence of length 15 generated by a 4-bit linear feedback shift register.

6. A method for providing synchronization in a communication system, comprising:
   generating a plurality of synchronization patterns, wherein each of the plurality of synchronization patterns differ from the other synchronization patterns by a multiple of 1/m of a symbol-time shift wherein the multiple of 1/m of the symbol-time shift is not a whole number;
   encoding each portion of a n portions of an information signal with a header, each header comprising one of the plurality of synchronization patterns, wherein m and n are any positive, non-zero integers such that m is not equal to n; and
   transmitting the encoded information signal over a communications system.

7. The method of claim 6, wherein the synchronization pattern is at least one of a random sequence, a pseudo-random sequence, and a periodic sequence.

* * * * *